US010354210B2

(12) United States Patent
Kour et al.

(10) Patent No.: US 10,354,210 B2
(45) Date of Patent: Jul. 16, 2019

(54) QUALITY PREDICTION

(71) Applicant: Hewlett-Packard Development Company, L.P., Fort Collins, CO (US)

(72) Inventors: George Kour, Yehud (IL); Yaniv Toplian, Yehud (IL); Alon Vinik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 14/688,646

(22) Filed: Apr. 16, 2015

(65) Prior Publication Data

US 2016/0307133 A1  Oct. 20, 2016

(51) Int. Cl.
*G06F 9/44* (2018.01)
*G06Q 10/06* (2012.01)

(52) U.S. Cl.
CPC .............................. *G06Q 10/06313* (2013.01)

(58) Field of Classification Search
CPC .... G06F 8/70; G06F 11/3688; G06F 11/3684; G06F 11/3636; G06F 11/3664
See application file for complete search history.

(56) References Cited

U.S. PATENT DOCUMENTS

| 5,655,074 | A | 8/1997 | Rauscher |
| 6,477,471 | B1 | 11/2002 | Hedstrom et al. |
| 7,856,616 | B2 | 12/2010 | Chang et al. |
| 8,170,841 | B2 | 5/2012 | Pinto et al. |
| 2001/0025267 | A1* | 9/2001 | Janiszewski ........... G06Q 30/06 705/37 |
| 2002/0141422 | A1* | 10/2002 | Hu .......................... H03M 7/40 370/408 |
| 2009/0265317 | A1* | 10/2009 | Buehrer .................. H04L 47/10 |
| 2011/0066490 | A1* | 3/2011 | Bassin .................... G06Q 10/06 705/14.48 |
| 2011/0321007 | A1* | 12/2011 | Marum ..................... G06F 8/65 717/113 |
| 2013/0061202 | A1* | 3/2013 | Nema ............... G06Q 10/06395 717/101 |
| 2013/0311968 | A1* | 11/2013 | Sharma .................. G06Q 10/06 717/101 |

(Continued)

OTHER PUBLICATIONS

Choosing Software Metrics for Defect Prediction: An Investigation on Feature Selection Techniques.

*Primary Examiner* — Chat C Do
*Assistant Examiner* — Lenin Paulino

(57) ABSTRACT

A set of predicted binary quality indexes is created from a sample set of application lifecycle information and customer encountered defects (CED) for each module id and revision (rev) pair for each application. Normalized effort and quality related factors are extracted for each module id and rev pair of each application. A binary quality index is created based on a set of weighted CED ratings for each module id and rev pair of each application. A prediction model for the binary quality index is created by training a decision tree-based classifier with the sample set to create a set of prediction weights for each effort and quality factor. The set of prediction weights is applied to the effort and quality related factors to each module id and rev pair of an application under-development to create the set of predicted binary quality indexes.

18 Claims, 5 Drawing Sheets

(56) References Cited

U.S. PATENT DOCUMENTS

| | | | |
|---|---|---|---|
| 2014/0143756 A1* | 5/2014 | Liang | G06F 8/36 717/120 |
| 2015/0100940 A1* | 4/2015 | Mockus | G06F 8/70 717/101 |

* cited by examiner

QUALITY PREDICTION

BACKGROUND

Large software projects are difficult to manage as many of the problems, defects, issues, or more colloquially "bugs" found in the software do not occur until late in the development cycle. These "bugs" have a great deal of impact on the customer satisfaction and several attempts have been made to mitigate their appearance. For instance, companies may introduce "beta" versions of the software or release early "developer" versions. In these versions there is at least an expectation by the customer/user that there will be some "bugs" present but that the main functionality of the software is basically intact. Additional testing and review may be done with an expectation that later released versions of the software will have most "bugs" removed or corrected.

BRIEF DESCRIPTION OF THE DRAWINGS

The disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

Figure 1:
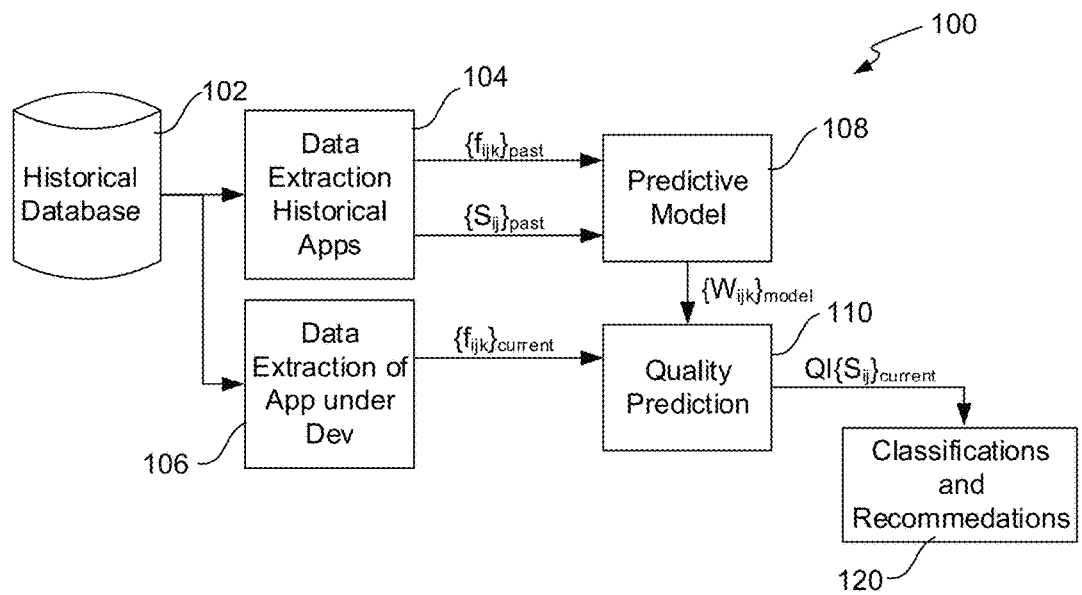
FIG. 1 is an example block diagram of a system to transform application lifecycle data into effective insights.

In the following detailed description, reference is made to the accompanying drawings which form a part of this disclosure. The drawings illustrate by way of specific examples various uses in which the present disclosure may be practiced. It is to be understood that other examples may be utilized and structural or logical changes may be made without departing from the scope of the present disclosure.

Late-stage development and early releases of software are generating an enormous amount of additional defect or "bug" identification that needs corrective action before a "final" application product can be released. Much of the internal and external testing information of past and current applications is stored in Application Lifecycle Management (ALM) tools, such as Hewlett-Packard's QUALITY CENTER' product as one example. These ALM tools create massive piles of data that are difficult even for the most skilled software experts to evaluate and scrutinize, much less so project managers and other decision makers. Accordingly, project managers would like a simple and effective way to analyze and use data captured within an ALM to help guide their software projects in order to balance the cost, quality, and time to completion for applications under development and keep them from being steered off course before final release.

Consequently, to help navigate software projects during their development and to get them back on course near their completion, this disclosure discloses systems and methods to predict problematic software modules for software application products under development that will allow managers or other decision makers to better utilize their available resources while improving product quality. This disclosure describes and teaches how to use the information from within a historical database of prior software projects' lifecycle and other development information to find trends in the defect injection and quality improvement activities of applications under development. This system allows for quality assessment of the development process and the progress of different applications under development to derive quality related insights which can be used to optimize the resource utilization, cost, quality, and time to final release.

The techniques presented in this disclosure are based on the assumption that the quality of a software product is directly proportional to a) the volume of the defects injected during development and b) the elimination activities used to remove the defects along with the correlation between the two. A quality prediction engine is trained to differentiate between "Good" and "Bad" quality patterns for the various function-related modules within an application within a product development lifecycle workflow. Such patterns not only facilitate the prediction of module quality but also enables the system to provide decision makers with significant meaningful insights and expediently useful action items to remediate any identified problematic work-flows and procedures within the development process. Such insights may include inefficient defect detection efforts, inefficient defect fixing efforts, late defect detection, late defect handling, and unbalanced QA development efforts, as just a few examples.

Typical software development efforts, such as new feature set implementations, are likely to degrade quality by introducing new defects or "bugs" into the software. In contrast, quality improvement and defect elimination efforts consist of defect detection activities such as executing tests, defect solving, and code re-factoring. The distribution of software developers and quality assurance engineers to each of the various efforts invested in these two activities during the development cycle has a significant influence on final software product quality.

The proposed approach within consists of four main stages: Historical Data Collection, Factor Extraction, Prediction Model Training, and Quality Prediction. These stages use statistical analysis and machine learning techniques to convert information within ALM systems into predictive future quality parameters that are used to provide precise and easy to comprehend recommendations and insights along with expedient and useful action items.

FIG. 1 is an example block diagram of a system 100 to transform application lifecycle data into effective insights. A compilation of various software management systems of past and current application development activities and internal and external test results are aggregated into historical database 102. Normalized data from past application development is extracted from past historical application ALM data in block 104. This extracted data is a past set of effort and quality related factors ($\{f_{ijk}\}_{past}$) for each distinct functional module within a larger software application. The k amount of effort and quality related factors are indexed or labeled by not only the particular module j identification (id) but also the particular revision i (rev) or release of the particular module. This partitioning of the data by module id and rev pairs (ij) for each k factor allows for increased accuracy in detecting the various patterns of test-fix that inevitably develop during the course of software development. This detection consequently helps to provide precise insights in how to test and correct for such patterns.

Also a sample set $\{S_{ij}\}_{past}$ of Consumer Encountered Defects (CEDs) indexed by their severity rating is extracted for each module id and rev pair in block 104 from historical database 102 along with the sample set $\{f_{ij}\}_{past}$ of effort and quality factors for each module for each j module and i revision. These samples of CEDs $\{S_{ij}\}_{past}$ are used to create a quality index $QI(S_{ij})_{past}$ for each module that is used along with the set of effort and quality related factors in predictive model training 108 using a decision tree-based classifier to create a set of quality prediction weights ($\{W_{ijk}\}$) for each effort and quality factor for each module id and rev pair. In block 106, a current software application under development has its effort and quality related factors extracted from the historical database 102 to create a current set of effort and quality factors ($\{f_{ijk}\}_{current}$). This current set of effort and quality factors are applied to the set of quality prediction weights from block 108 in block 110 to create a predicted set of CED quality $\{QI(S_{ij})_{current}\}$ and a binary set of quality ratings $\{Q((S_{ij})_{current})\}$ for each module in the current software application under development. This predicted set of CED quality and binary set of quality indexes is then used in block 120 to make various predictions, insights, and recommendations for decision makers. The sample set of data extracted from historical database 102 can also include related or linked test information and defect identification.

Figure 2:
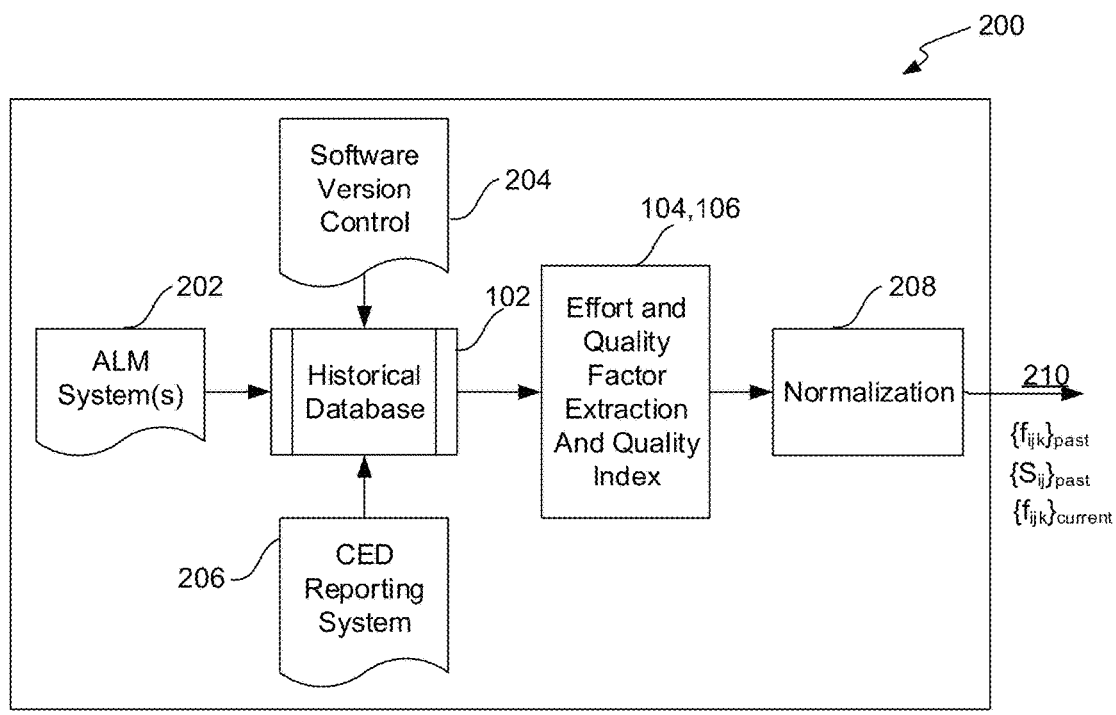
FIG. 2 is an example block diagram of a data mining system to extract effort and quality factors along with a quality index from a historical database.

FIG. 2 is an example block diagram of a data mining system 200 to extract effort and quality factors along with a quality index from a historical database of past and current software development efforts and results. The historical database 102 aggregates data from multiple sources such as ALM systems 202, software version control 204 or source code version control systems, and Customer Encountered Defect (CED) reporting systems 206. The historical database 102 includes multiple effort factors such as test related-information and multiple quality factors such as defect identification. All historical data of software projects in the historical database is apportioned and indexed by each module identification (id) and revision (rev) pair of each application under development. Each module of a larger software application is responsible for the functionality of usually one or two feature related aspects of the entire software application project. This breakdown of information by module id and revision allows for far more accurate quality prediction capability and targeting of specific areas of software to focus effort and cost in order to get projects to a high quality release state in the most optimum amount of time. Accordingly, the data samples generated from the historical database are the past quality and effort factors 104 or current factors 106 for a set of modules in a specific release or revision of the current software under development.

As some users may use several different ALM products for managing one or more applications' lifecycle data, synchronization tools can be used to import the data from the various different ALM systems to the historical database. Alternatively, different views of the predictions made in block 120 (FIG. 1) from the different ALM systems can be presented using diverse schemas to perform the predictions based on the data stored from each differing ALM system.

The factor extraction from the historical database includes effort and quality related factors 104 for each module id and rev pair for each software application product given the lifecycle data of previous releases. These factors can be assigned into three main groups. The first group of factors are indicative of the volume of the defect injection activities carried out in a release, such as the number of developers, the backlog volume, number of check-ins, number of fixed defects, average defect lifetime, etc. The second group of factors are indicative of the defect elimination efforts such as the number of testers, the number of test cases, the number of defects, etc. The third group contains other features that give a strong quality level indication of the software product, such as the number of regressions and average defect lifetime as a couple of examples.

How these various extracted factors relate to the overall quality is determined by equating a weighted set of the factors from block 104 (FIG. 1) to an overall quality index determination based on a severity weighting of the respective Customer Encountered Defects (CED)s for the particular module id rev pair. Rated CED data is one of the most objective indication of software application product quality, particularly within the enterprise software business market. CEDs have a great influence on the amount of organization money and time invested in a project prior to and after the project release, and also on the core business of the organization and brand name. Accordingly, the extracted sample factor data for CEDs is rated or "quality labeled" by the respective number and severity of defects found by the organization Quality Assurance (QA) department after the code freeze or feature freeze to define the sample labeling. This CED quality index $QI(S_{ij})_{current}$ is then classified or indexed as "Good" or "Bad" in a binary or other ordinal fashion in block 120 (FIG. 1) for each module id and rev pair for each application.

Because the various effort and quality factors may have different scales, each of the different modules in dissimilar releases should be normalized in block 208 to a single scale. For instance, the same module with the same quality in two different releases or versions can have attributes that are in different scales especially if the two compared releases have large differences between their respective time lengths. In addition, normalization is needed to bring large and small modules, which may have very different attributes, to be compared to the same scales. For example, when learning from post releases, obviously every release has a different development time, number of features, the time that has passed since it was released and so on. To create some baseline, the fields are normalized, for example, by taking the first six months since the release date and collecting the information during that specific time.

Figure 3:
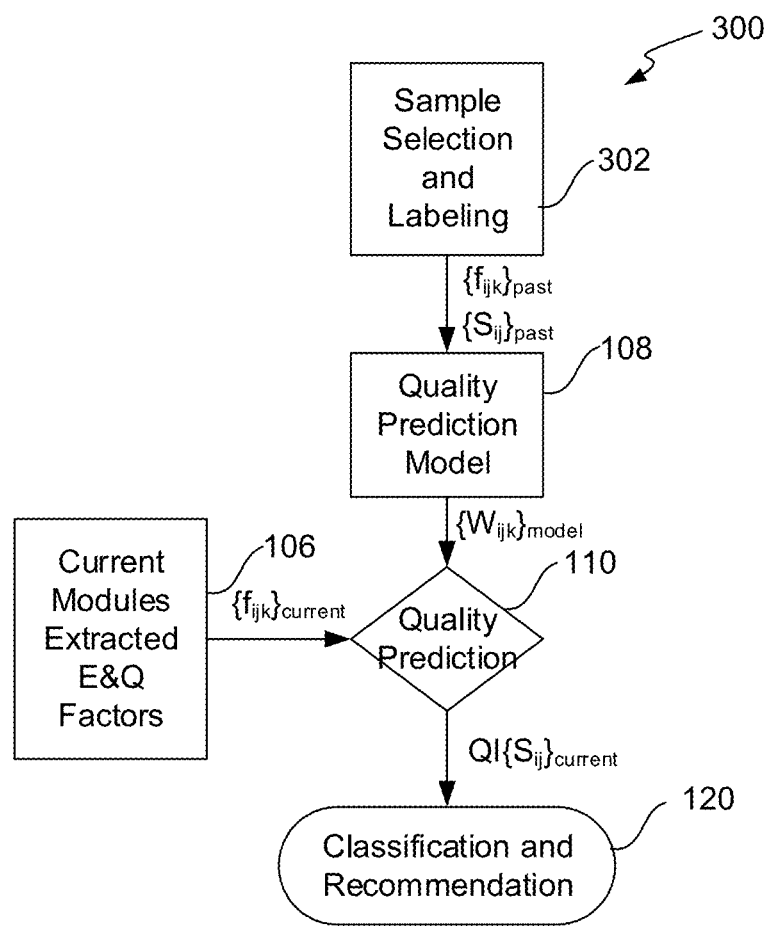
FIG. 3 is an example flowchart of a method of sampling data and training a prediction model to be used to classify and make recommendations for a current under-development module.

FIG. 3 is an example flowchart 300 of a method of sampling data and training a quality prediction model 108 to be used to classify and make recommendations for a set of current application under-development modules. In block 302, a sample of the historical data collection 102 is sampled and labeled before applying to block 108 which performs the quality prediction model training. The prediction model training in block 108 is used to create a set of quality prediction weights ($\{W_{ijk}\}$) for each effort and quality factor $f_k$ by training a decision tree-based classifier with the set of extracted samples from the historical database. One example schema of the extracted sample data set may represented as:

$$\begin{array}{c} & f_1 & \cdots & f_k & Q(S_{ij}) \\ S_{11} & \begin{pmatrix} \alpha & \cdots & \beta & \text{Good} \\ \vdots & \ddots & \vdots & \vdots \\ S_{ij} & \gamma & \cdots & \delta & \text{Bad} \end{pmatrix} \end{array}$$

A sample is a specific module in a certain release of an application in the historical database, and is denoted as: $f_1 \ldots f_k$, (where k=number of effort and quality factors) which are the various effort and quality factors for each module id and rev pair. $S_{ij}$ is the sample label where i=Release revision (rev) and j=Module ID (id), $Q(S_{ij})$ denotes the binary or other ordinal quality of the corresponding module in the relevant release, which may be classified as "Good" or "Bad" in one example. $Q(S_{ij})$ is determined by the Quality Index $QI(S_{ij})$ which is calculated based on the number of CEDs weighted by their severity, such as:

$$QI(S_{ij}) = 10 * CED_{critical} + 6 * CED_{high} + 3 * CED_{medium} + CED_{low}$$

Given a sample $S_{ij}$, if $QI(S_{ij})$ is greater than a pre-set value t, the module $S_{ij}$ is considered of a "Bad" quality otherwise it is classified as having a "Good" quality. In one example, the pre-set value t was determined by empirical tuning with the above severity coefficients to be 6. Accordingly, a $QI(S_{ij})$ greater than 6 would be classified as "Bad" and a $QI(S_{ij}) \leq 6$ would be classified as "Good". Thus in one example, every defect found by a customer is given a weight for its impact on defect severity. The above equation means that a critical CED defect gets 10 points, while a high CED defect gets 6 points, a medium one 3 points, and a low one 1 point. These numbers are cumulated per software module id and rev pair and a red-line is determined. When the Quality index $Q/(S_{ij})$ is below the red-line, it is green-lighted or classified as "Good" and if above the red-line, it is classified as "Bad" or red-lighted. By having a binary or ordinal classification for the quality index the decision maker is given clarity and easier identification of the problematic modules that he/she needs to focus on in order to improve the total product quality.

Once a prediction model 108 is created, all of the current modules 106 within the current overall software application may be applied to the prediction model 108 to create a predicted sample of binary quality in the classification and recommendation block 120 for each module id and rev pair. A set of quality index scores $\{Q/(S_{ij})\}$ are predicted for each module id and rev pair from which a "Good" or "Bad" classification $\{Q(S_{ij})\}$ can be made and presented to the decision makers.

Figure 4A:
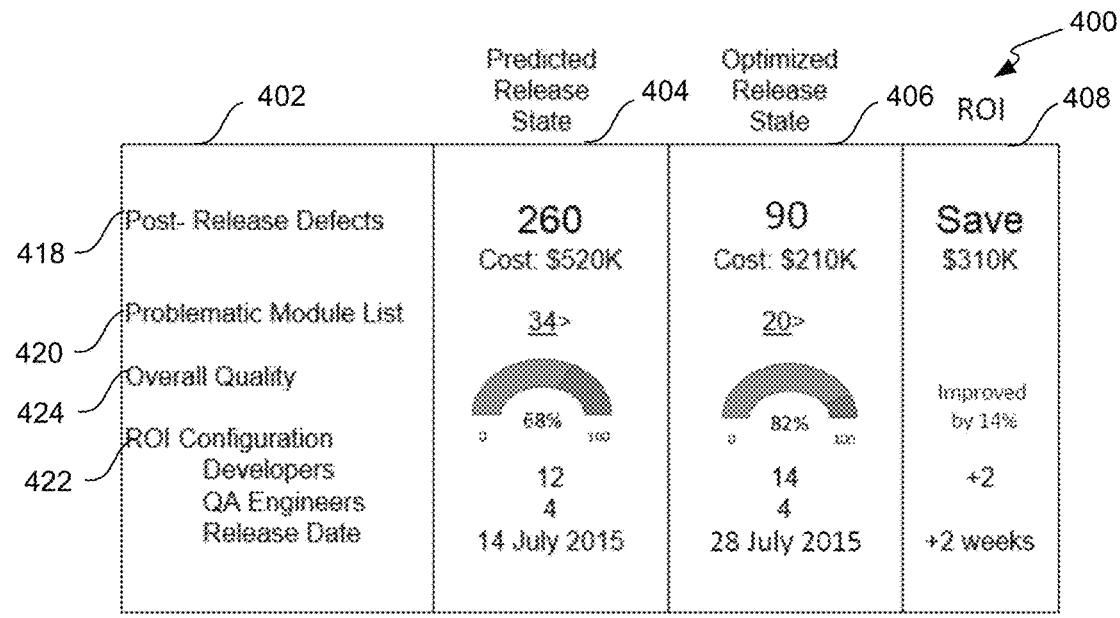
FIG. 4a is an example presentation of insights and recommendations for an application using a prediction model derived from historical application lifecycle data.

FIG. 4a is an example presentation 400 of insights and recommendations for an application using a prediction model 108 derived from historical application lifecycle data 102. The quality prediction of the Predicted Release State 404 is used to help isolate and spot problematic modules as well as determine the best return on investment (ROI) as generally not everything that is identified as a "bug" can be fixed before the software application is released to customers. For example, the best ROI 408 can be defined using a partial selection of red-lighted modules. Since one cannot repair all red-lighted modules, there is usually a compromise on quality vs. the time and/or resources required to invest in correct the identified problems. This ROI 408 is calculated by how far a red-lighted module is from the red-line, how many defects there are identified with it, what the complexity of fixing the defects is for the module, and what chance there is that fixing the module might cause a deterioration in quality. The chance of fixing the module is learned by examining the history of defects classification.

For instance, in the example shown in FIG. 4a, region 402 highlights some possible labels for the ROI information. Post-release defects 418 is the predicted number of defects for the overall application in the Predicted Release State 404 and the Optimized Release State 406 based on choices made by management in ROI configuration 422, such as in this example the number of developers being increased by 2. The system determines that if two more developers are added then the amount of good modules or overall quality 424 can be increased from 68% to 82% (an absolute 14% increase in "Good" modules) and the release date extended by two weeks from 14 July 15 to 28 July 15. Also, the problematic module list 420 is shown as being reduced from 34 modules to 20 modules.

The problematic module list 420 amount is shown in this example as having an underscore or hyperlink. A manager may click on the amount and a list of the problematic modules will be presented which can be sorted by various criteria such as each of the various effort and quality factors, the predicted quality index score, predicted CEDs and their severity ratings, linked test cases, and the least amount of time, cost, resources, etc. to get to a "good" state. This drill down to more detailed information allows the manager to gain more particular insight into those modules which are categorized as "Bad" and the particular actions necessary to get them to a "Good" state.

The prediction engine also is able to provide visibility on predicted cost along with the predicted quality index and predicted post-release defects 418. The information on how much it will cost to invest the time and money to find the predicted defects using any related linked test cases the system points to from the historical database versus waiting for them to be found by the customer and the increased cost to fix them. This cost information in FIG. 4a allows a manager to make a decision based on a budget they have with respect to the other projects the manager has in place, and accordingly decide whether and how much to invest in finding and correcting the predicted defects.

Figure 4B:
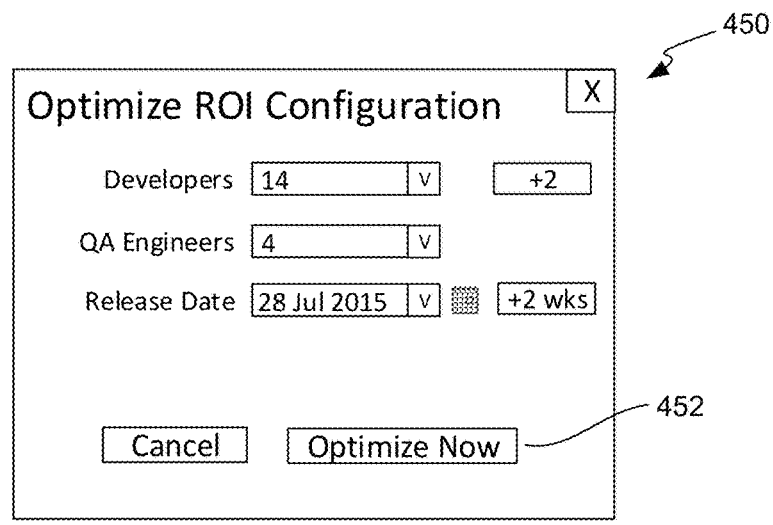
FIG. 4b is an example pop-up window to allow for configuration of parameters to allow a prediction model to create an optimized return on investment (ROI)

FIG. 4b is an example pop-up window 450 to allow for a configuration of ROI parameters that allows a prediction model to create an optimized return on investment (ROI). In this example, a decision maker can explore various possibilities by changing the number of developers, the number of QA engineers, and the time from the desired release date, each from the Predicted Release State 404. By clicking on the "Optimize Now" button 452, the system computes the Optimized Release State 406 and the ROI 408. Accordingly, the decision maker has the capability to let the system take into account his/her constraints, such as adding/removing resources and/or increase/delay the release time. Each time the constraints are updated and the "Optimize Now" button 452 clicked, the system calculates, updates, and presents the Optimized Release State 406 in terms of predicted quality. For instance, in one example, by adding more resources, one can spend more money during the pre-release and fix all the recommended defects by the original release date. In another example, one can postpone the release date in order to allow more time to fix the predicted CEDs using the available resources. Consequently, by having a clear visual status of the release quality and allowing the decision maker to focus on the best ROI given his/her constraints and desired quality, the decision maker is able to converge on the best recommendations for that particular software project.

For example, based on historical and empirical data, it is estimated that the cost to correct a customer encountered defect (CED) pre-release is 10 times less than the cost to fix the CED post-release. For some organizations, the estimated cost to fix a CED during the release development phase is between about $150 and $200 and thus about $1500 to $2000 post-release the development phase. Assume for example, the cost for an organization is $200 pre-release and $2000 post-release. In the example of FIG. 4a, the Predicted Release State 404 has 34 problematic modules for a total of 260 predicted CEDs. The cost to fix these 260 CEDs would be 260*$2000 or $520,000 if fixed post-release. However, based on the ROI configuration 422 provided by the decision maker in ROI pop-up window 450, the system recommends only focusing efforts on the top 20 problematic modules of the 34 identified to run linked test cases from the historical database. That is, the system is predicting that by fixing 20 problematic modules pre-release during the release development phase, 150 CEDs will be found and repaired leaving 90 predicted CEDs that are still be found by the customers as not everything can be corrected and the decision maker is looking for the best ROI. By selecting this example ROI configuration, the organization is estimated to spend (150*$200) for pre-release fixes and (90*$2000) for CEDs post-release or $210,000. The predicted total money saved is the $510,000 for the Predicted Release State 404 less the $210,000 for the Optimized Release State 406 or $310,000 as noted in the ROI 408 in FIG. 4a.

As a result, the prediction engine can help project managers and other decision makers to optimize their resource allocation such as budgets, employees, contractors, tools, etc. The prediction engine also helps to pinpoint the most problematic quality issues before going to market, such as by being able to explore in more depth the problematic module list 420. The cost savings are enhanced by having the prediction engine concentrate the effort in quality improvement activities on the identified "Bad" or red-lighted modules rather than focusing on quality improvement activities in modules which have already been classified as "Good" or green-lighted. Further, by having a module by module classification of "Good" and "Bad", a clearer picture of the overall quality 424 of the product is easily visualized (such as the example in FIGS. 4a and 4b) by the appropriate decision makers.

In one example, a proof of concept was undertaken using an end-to-end management solution software application product that integrates network, server, application, and business transaction monitoring. Data was collected from the various minor releases of the software application's two major version releases as well as all of its next minor-minor releases and patches. The sample set was split into training and testing sets, containing 70% and 30% of the data samples, respectively. Several different classification algorithms were investigated using the WEKA™ DATA MINING SOFTWARE. After much examination of various classification algorithm results, it was determined that the Bootstrap aggregating (Bagging) algorithm achieved the best results which are shown in Table 1. However, in different examples, other machine learning algorithms may predict better depending on the characteristics of the particular historical data.

TABLE 1

Classification Results of the Bagging Algorithm

| Class | True Positive | Precision | Recall |
|---|---|---|---|
| Good | 83% | 91% | 84% |
| Bad | 75% | 60% | 75% |
| Overall | 82% | 84% | 82% |

As seen in Table 1, the system demonstrated promising results. A second proof of concept was performed on another large software project to confirm the solution validity and comparable results were obtained (80% prediction accuracy). Improved accuracy can be achieved by breaking up the aggregate data during an entire release into further subsets, such as looking for patterns of test-fix during the release development which may have a great impact on a particular module's quality. Such patterns will not only facilitate the prediction of the module quality but will enable the system to provide the decision makers with even more meaningful insights and action items to remediate problematic work-flows and procedures in the development process.

Figure 5:
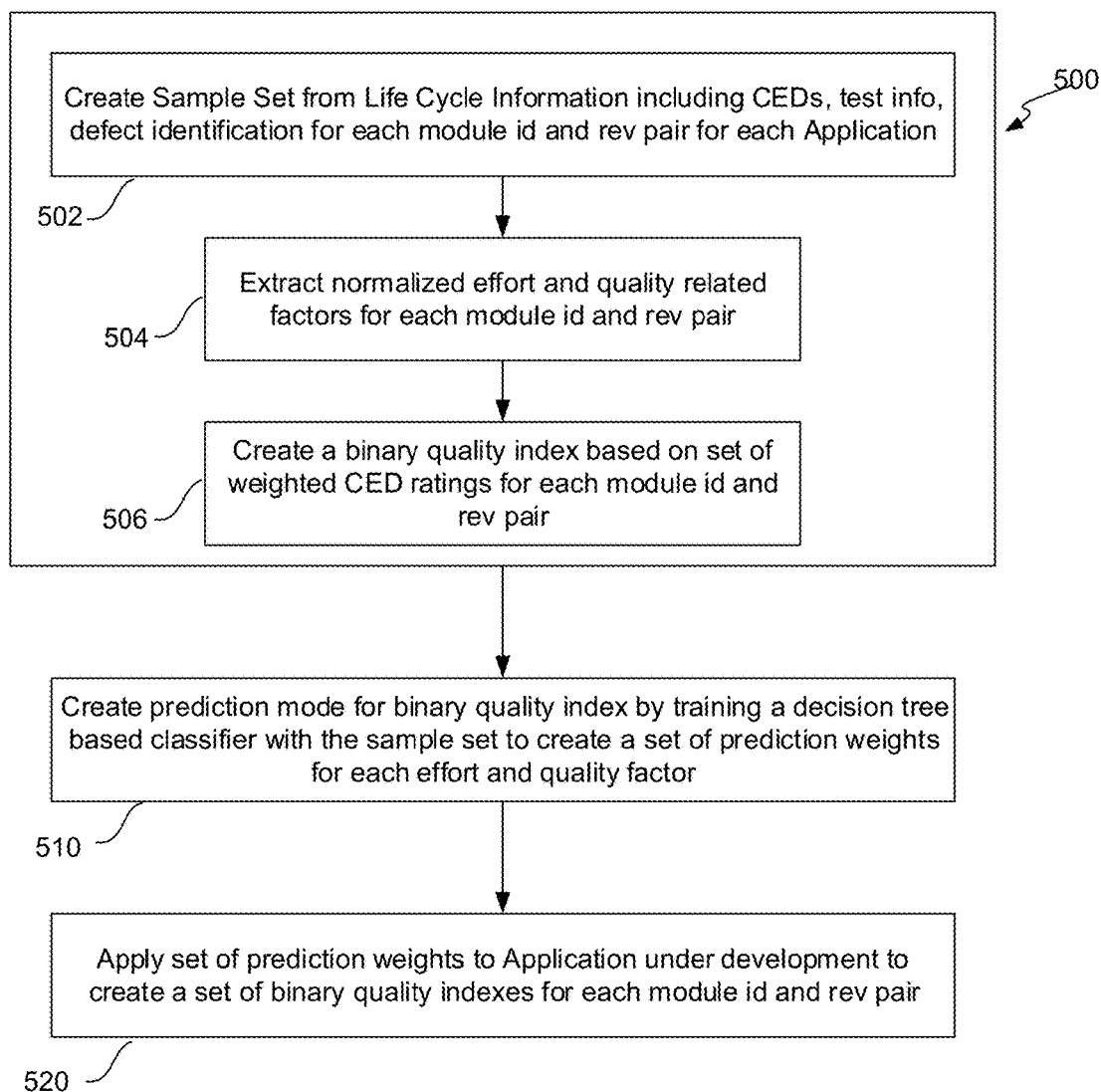
FIG. 5 is an example flowchart of a method to transform application lifecycle data into effective insights.

FIG. 5 is an example flowchart 500 of a method to transform application lifecycle data into effective insights. Consequently, a method for transforming application lifecycle data into effective insights includes in block 502 creating a sample set from a historical database of lifecycle information for a plurality of applications including customer encountered defects (CED), test information, and defect identification for each module id and revision pair for each application. This creation of the sample set is done in block 504 by extracting normalized effort and quality related factors for each module id and rev pair of each application and in block 506 by creating a binary quality index based on a set of weighted CED ratings for each module id and rev pair of each application. In block 510, a prediction model for the binary quality index is created by training a decision tree-based classifier with the sample set to create a set of prediction weights for each effort and quality factor. In block 520, the set of prediction weights is applied to each module id and rev pair of an application under-development to create a set of predicted binary quality indexes for each module id and rev pair.

Figure 6:
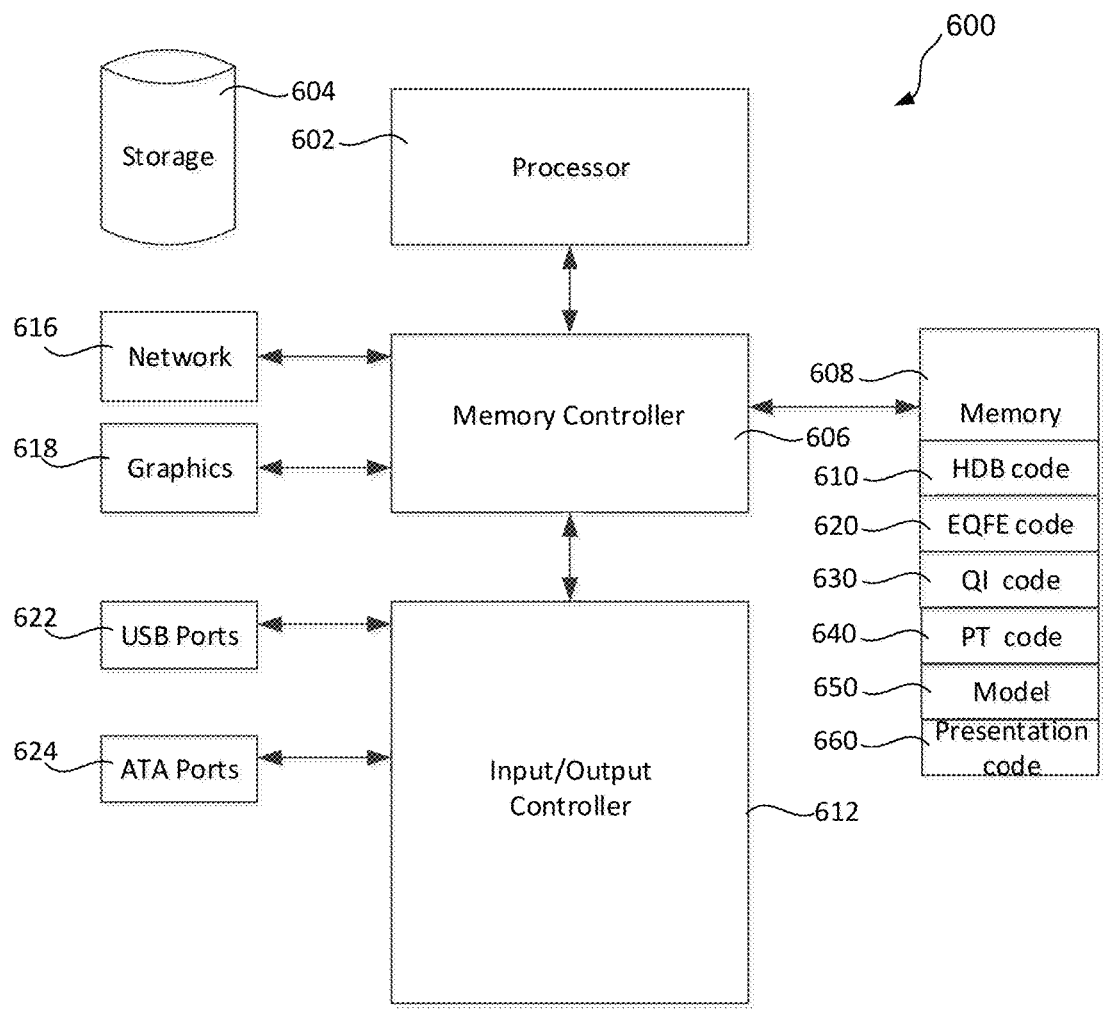
FIG. 6 is an example computer system for implementing an automated system to create a set of predicted binary quality indexes.

FIG. 6 is an example computer system 600 for implementing an automated system 100 (FIG. 1) to create a set of predicted binary quality indexes for each module id and rev pair for an application under development. A processor 602 is connected to a memory controller 606 which is further connected to an Input/Output (I/O) controller 612. Memory controller 606 provides a high bandwidth and high speed interface to network 616, graphics 618, and non-transient computer readable memory 608 which includes instructions for performing tasks on processor 602, such as historical database (HDB) code 610, effort and quality factor extraction (EQFE) code 620, quality index (QI) code 630, prediction training (PT) code 640, model generation code 650, and prediction and presentation code 660.

I/O controller 612 provides several different input/output interfaces to allow processor 602 to retrieve or provide information. Several types of I/O interfaces are shown as non-limiting examples, such as Universal Serial Bus (USB) Ports 622 and Asynchronous Transfer Attachment (ATA) Ports 624. While memory controller 606 and I/O controller 612 are shown as two separate blocks, in some examples the blocks may be combined or alternatively broken into several different blocks. Storage 604 may be connected to computer system 600 in various possible fashions, such as with Network 616, ATA Ports 624, and USB ports 622. Storage 604 may include one or more copies of various repositories, historical database 102, past and current extracted effort and quality factors, calculated and predicted quality indexes, as just some examples.

As such, a system for managing software development, includes a historical database of lifecycle information for a plurality of applications including customer encountered defects (CED), test information, and defect identification for each application indexed by each application module revision(i) and identification(j). A data extraction module creates a sample data set ($S_{ij}$) from the historical database. The sample dataset has a set of normalized effort and quality related factors for each $S_{ij}$ of each sampled application, and a quality index indicating a Good/Bad indication for each $S_{ij}$ based on the CEDs for each $S_{ij}$ and the respective severity level of the CED. A prediction model training module predicts the quality index Good/Bad indication for an under-development application. The training module is configured to use a decision tree-based classifier with the sample data set to create a set of prediction weights for each effort and quality factor and to apply the set of prediction weights to each respective effort and quality factor for each $S_{ij}$ of the application under-development to create a set of predicted Good/Bad quality indexes for each $S_{ij}$.

The data extraction of past and current effort and quality factors, the calculated and predicted quality indexes, the predictive model training, model application, and presentation code may also be described in the general context of non-transitory computer code or machine-useable instructions, including computer-executable instructions such as program modules or logic, being executed by a computer or other computing machine, such as a personal data assistant or other handheld device. Generally, program modules including routines, programs, objects, components, data structures, etc., refer to code that performs particular tasks or implements particular abstract data types. The data extraction of past and current effort and quality factors, the calculated and predicted quality indexes, the predictive model training, model application, and presentation code may be practiced in a variety of system configurations, servers, clients, virtual machines, containers, cloud-based systems, general-purpose computers, more specialty computing devices, etc. They may also be practiced in distributed computing environments where tasks are performed by remote-processing devices that are linked through a communications network.

Computer-readable media (CRM) can be any available tangible and non-transitory media that can be accessed by computer system 600. Computer storage media 604 and memory 608 include both volatile and nonvolatile, removable and non-removable media implemented in any method or technology for storage of information such as computer-readable instructions, data structures, program modules, or other data. Communication media typically embody transitory computer-readable instructions, data structures, program modules, or other data in a modulated data signal such as a carrier wave or other transport mechanism and include any information delivery media. However, once received and stored, the communication media becomes non-transitory.

Network 616 allows computer system 600 to communicate with other computing devices including datacenter or cloud-based servers through one or more intranet, Internet, private, custom, or other networking protocols whether using wireless, wired, optical, or other electromagnetic techniques.

As a result, a non-transitory computer readable medium (CRM) comprising computer readable instructions that when executed by a processor cause the processor to extract data from a historical database of lifecycle information for a plurality of applications that includes customer encountered defects (CED), test information, and defect identification for each application indexed by each application module revision (i) and identification (j) to create a sample data set ($S_{ij}$) from the historical database. The sample dataset includes a set of normalized effort and quality related factors for each $S_{ij}$ of each sampled application, and a quality index indicating a Good/Bad indication for each $S_{ij}$ based on the CEDs for each $S_{ij}$ and their respective severity levels. The quality index Good/Bad indication for an under-development application is predicted using a decision tree-based classifier with the sample data set to create a set of prediction weights for each effort and quality factor. A list of recommendations for the under-development application is presented by applying the set of prediction weights to the respective effort and quality related factors of each $S_{ij}$ of the under-development application to create a set of predicted Good/Bad quality indexes for each $S_{ij}$ and determining the shortest path from bad to good of the quality index state each $S_{ij}$.

While the claimed subject matter has been particularly shown and described with reference to the foregoing examples, those skilled in the art will understand that many variations may be made therein without departing from the scope of subject matter in the following claims. This description should be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method to create a set of predicted binary quality index scores, comprising:
   extracting, from a historical database, a set of past effort and quality related factors and a set of consumer encountered defects (CEDs) for each module identification (id) and revision pair of each module of modules in a past application;
   determining, by a processor of a computing device, a quality index score for each module id and revision pair of the modules of the past application by multiplying each CED in the set of CEDs to a number representing a severity rating of the CED, and summing all of the multiplications to output the quality index score for each module id and revision pair;
   training, by the processor, a prediction model by applying machine learning to link, for each module id and revision pair, the set of past effort and quality related factors with a respective quality index score that was determined for each module id and revision pair;
   applying the prediction model to a set of current effort and quality related factors for each module id and revision pair of modules in an under-development application to create the set of predicted binary quality index scores for each module id and revision pair of the modules in the under-development application;

creating a list of recommendations for each module id and revision pair of the modules in the under-development application based on the set of predicted binary quality index scores;

presenting the list of recommendations for the under-development application by applying a set of prediction weights in the prediction model to the current effort and quality related factors of each module id and revision pair of the modules in the under-development application to create a set of predicted Good or Bad binary quality indexes for each module id and revision pair of the modules in the under-development application;

determining a predicted release state for the under-development application based on at least one of the presented list of recommendations and a configuration of resources for developing the under-development application;

accepting a change in the configuration of resources that is capable of impacting a release date of the under-development application; and generating an optimized release state, including a change to the release date if the release date is impacted, based on the change in the configuration of resources.

2. The method of claim 1, wherein a decision tree-based classifier uses a bootstrap aggregating classifier with a Bagging algorithm using a first sub-set of the extracted set of past effort and quality related factors to create the prediction model and a second sub-set of the extracted set of past effort and quality related factors to test the prediction model.

3. The method of claim 1, comprising: using synchronization tools to import data from two or more different application lifecycle management systems to the historical database.

4. The method of claim 1, further comprising:
determining a path from bad to good of each respective quality index score for each module id and revision pair of the modules in the under-development application.

5. The method of claim 1, further comprising:
indexing the set of past effort and quality related factors by the module id of each of the modules and by the revision of the respective module.

6. The method of claim 1, further comprising:
determining a total number of module id and revision pairs having a respective binary quality index score that is classified as requiring remediation;
identifying a first set of module id and revision pairs to remediate and a corresponding first result if the first set of module id and revision pairs were remediated;
identifying a second set of module id and revision pairs to remediate and a corresponding second result if the second set of module id and revision pairs were remediated; and
generating a presentation comprising the first set of module id and revision pairs, the first result, the second set of module id and revision pairs, and the second result.

7. The method of claim 6, further comprising:
providing an interface with the presentation;
receiving, via the interface, a parameter to optimize the first result;
updating the first result based on the parameter; and
revising the presentation to include the updated first result.

8. A system to predict quality, comprising:
a processor;
a non-transient computer readable memory including instructions that when executed by the processor cause the processor to:
extract, from a historical database, a set of past effort and quality related factors and a set of consumer encountered defects (CEDs) for each module id and revision pair of each module of modules in a past application;
determine a quality index score for each module id and revision pair of the modules in the past application, based on a multiplication of each CED in the set of CEDs to a number representing a severity rating of the CED, and a summation of the multiplications to output a quality index score for each module id and revision pair;
determine a binary quality index score indicating a Good or Bad indication for each module id and revision pair of the modules of the past application based on a comparison of the quality index score of each module id and revision pair to a threshold;
train a prediction model based on an application of machine learning to link, for each module id and revision pair, the set of past effort and quality related factors with a respective quality index score, the prediction model including a set of quality prediction weights for the set of past effort and quality related factors based on the binary quality index scores;
apply the set of quality prediction weights to a set of current effort and quality related factors for each module id and revision pair of modules in an under-development application to generate a set of predicted Good or Bad binary quality index scores for each module id and revision pair of the modules in the under-development application;
create a list of recommendations for each module id and revision pair of the modules in the under-development application based on the set of predicted binary quality index scores;
present the list of recommendations for the under-development application by applying a set of prediction weights in the prediction model to the current effort and quality related factors of each module id and revision pair of the modules in the under-development application to create a set of predicted Good or Bad binary quality indexes for each module id and revision pair of the modules in the under-development application;
determine a predicted release state for the under-development application based on at least one of the presented list of recommendations and a configuration of resources for developing the under-development application;
accept a change in the configuration of resources that is capable of impacting a release date of the under-development application; and
generate an optimized release state, including a change to the release date if the release date is impacted, based on the change in the configuration of resources.

9. The system of claim 8, wherein a decision tree-based classifier uses a bootstrap aggregating classifier using a first sub-set of the set of past effort and quality related factors to create the prediction model and a second sub-set of the set of past effort and quality related factors to test the prediction model.

10. The system of claim 8, wherein the instructions are to cause the processor to create the list of recommendations for the under-development application based on a path from bad to good for the binary quality index score for each module id and revision pair of the modules in the under-development application.

11. The system of claim 8, wherein the instructions are to cause the processor to present a predicted release state, an optimized release state, and a return on investment.

12. The system of claim 8, wherein the instructions are to cause the processor to:
index the set of past effort and quality related factors by the module id of each of the modules and by the revision of the respective module.

13. A non-transitory computer readable medium (CRM) comprising computer readable instructions that when executed by a processor cause the processor to:
extract, from a historical database, a set of past effort and quality related factors and a set of consumer encountered defects (CEDs) of each module identification (id) and revision pair of each module of modules in a past application, wherein each CED in the set of CEDs is associated with a severity rating;
determine a quality index score for each module id and revision pair of the modules in the past application, based on a multiplication of each CED in the set of CEDs to a number representing the severity rating of the CED, and based on a summation of the multiplications to output a quality index score for each module id and revision pair;
compare the quality index score of each module id and revision pair to a severity threshold value to determine a binary quality index score of Good or Bad for each module id and revision pair of the modules of the past application;
train a prediction model based on an application of machine learning to link, for each module id and revision pair, the set of past effort and quality related factors with a respective quality index score, the prediction model including a set of quality prediction weights and trained based on a decision tree-based classifier with the set of CEDs and the binary quality index scores for each module id and revision pair of the modules in the past application;
apply the set of quality prediction weights to a set of current effort and quality related factors of each module id and revision pair of modules in an under-development application to generate a set of predicted binary quality index scores of Good or Bad for each module id and revision pair of the modules in the under-development application;
create a list of recommendations for each module id and revision pair of the modules in the under-development application based on the set of predicted binary quality index scores;
present the list of recommendations for the under-development application by applying a set of prediction weights in the prediction model to the current effort and quality related factors of each module id and revision pair of the modules in the under-development application to create a set of predicted Good or Bad binary quality indexes for each module id and revision pair of the modules in the under-development application;
determine a predicted release state for the under-development application based on at least one of the presented list of recommendations and a configuration of resources for developing the under-development application;
accept a change in the configuration of resources that is capable of impacting a release date of the under-development application; and
generate an optimized release state, including a change to the release date if the release date is impacted, based on the change in the configuration of resources.

14. The non-transitory CRM of claim 13, wherein the set of recommendations includes a return on investment.

15. The non-transitory CRM of claim 13, wherein the list of recommendations includes a problematic module list.

16. The non-transitory CRM of claim 13, wherein a decision tree-based classifier is a bootstrap aggregating classifier with a Bagging algorithm that uses a first sub-set of the set of past effort and quality related factors to create the prediction model and a second sub-set of the set of past effort and quality related factors to test the prediction model.

17. The non-transitory CRM of claim 13, wherein to present the set of recommendations, the instructions are to cause the processor to:
present the predicted release state with a return on investment (ROI) configuration of resources, a list of problematic modules, and a first estimated cost to fix problematic modules with the configuration of resources; and
present the optimized release state with an updated list of problematic modules and a second estimated cost based on a change in the configuration of resources.

18. The non-transitory CRM of claim 13, wherein the instructions are to cause the processor to:
index the set of past effort and quality related factors by the module id of each of the modules and by the revision of the respective module.

* * * * *